US008173023B2

(12) United States Patent
Tao et al.

(10) Patent No.: US 8,173,023 B2
(45) Date of Patent: May 8, 2012

(54) METHOD AND APPARATUS FOR TREATMENT OF A FLUID

(75) Inventors: Rongjia Tao, Cherry Hill, NJ (US); Xiaojun Xu, Glenside, PA (US)

(73) Assignee: Temple University of the Commonwealth System of Higher Education, Philadelphia, PA (US)

( * ) Notice: Subject to any disclaimer, the term of this patent is extended or adjusted under 35 U.S.C. 154(b) by 1133 days.

(21) Appl. No.: 11/596,198

(22) PCT Filed: May 13, 2005

(86) PCT No.: PCT/AU2005/000688

§ 371 (c)(1), (2), (4) Date: Oct. 31, 2007

(87) PCT Pub. No.: WO2005/111756

PCT Pub. Date: Nov. 24, 2005

(65) Prior Publication Data

US 2008/0190771 A1 Aug. 14, 2008

(30) Foreign Application Priority Data

May 14, 2004 (AU) ................................ 2004902563

(51) Int. Cl.
*B01D 59/48* (2006.01)

(52) U.S. Cl. ........ 210/695; 210/222; 204/557; 204/155; 585/800; 585/899

(58) Field of Classification Search ........................ None
See application file for complete search history.

(56) References Cited

U.S. PATENT DOCUMENTS

| | | | | |
|---|---|---|---|---|
| 3,186,929 | A * | 6/1965 | Rippie | 204/155 |
| 4,062,765 | A * | 12/1977 | Fay et al. | 209/1 |
| 4,201,140 | A * | 5/1980 | Robinson | 110/218 |
| 4,933,151 | A * | 6/1990 | Song | 422/186.01 |
| 4,935,133 | A * | 6/1990 | Hirama | 210/222 |
| 4,956,084 | A * | 9/1990 | Stevens | 210/222 |
| 5,380,430 | A | 1/1995 | Overton et al. | |
| 5,683,586 | A * | 11/1997 | Harcourt et al. | 210/695 |
| 5,804,067 | A * | 9/1998 | McDonald et al. | 210/222 |
| 7,004,153 | B2 * | 2/2006 | Lisseveld | 123/538 |
| 7,621,261 | B2 * | 11/2009 | Lisseveld | 123/538 |

* cited by examiner

*Primary Examiner* — Tam M Nguyen
(74) *Attorney, Agent, or Firm* — Stein McEwen, LLP

(57) ABSTRACT

An apparatus for the magnetic treatment of a fluid which produces at least one magnetic field for a period of time, $T_c$ at or above a critical magnetic field strength, $H_c$, the period $T_c$ and the field strength $H_c$ determined relative to one another and dependant upon the properties of the fluid.

8 Claims, 2 Drawing Sheets

METHOD AND APPARATUS FOR TREATMENT OF A FLUID

FIELD OF THE INVENTION

The present invention relates to the treatment of fluids, particularly hydrocarbons, fuels and oils and in particular to methods and devices for affecting the physical properties of the hydrocarbons using a magnetic field.

BACKGROUND ART

The use of magnetic devices and methods for the treatment of hydrocarbons is known in the prior art. However, the mechanisms and effects of such treatment are not well known and difficult to predict.

A sample of prior art in the general field of magnetic treatment of fuels is as follows:

U.S. Pat. No. 3,830,621—Process and Apparatus for Effecting Efficient Combustion.
U.S. Pat. No. 4,188,296—Fuel Combustion and Magnetizing Apparatus used therefor.
U.S. Pat. No. 4,461,262—Fuel Treating Device.
U.S. Pat. No. 4,572,145—Magnetic Fuel Line Device.
U.S. Pat. No. 5,124,045—Permanent Magnetic Power Cell System for Treating Fuel Lines for More Efficient Combustion and Less Pollution.
U.S. Pat. No. 5,331,807—Air Fuel Magnetizer.
U.S. Pat. No. 5,664,546—Fuel Saving Device.
U.S. Pat. No. 5,671,719—Fuel Activation Apparatus using Magnetic Body.
U.S. Pat. No. 5,829,420—Electromagnetic Device for the Magnetic Treatment of Fuel.

The prior art documents, of which the above represent only a small proportion, are specifically directed towards the treatment of a fuel stream for the purpose of either the prevention of scaling, corrosion or biological growth in pipes or alternatively, to increase the combustion efficiency of the fuel when burnt in an engine.

However, there are also a number of documents which propose devices for the "conditioning of a fluid or fuel" with the application of the device being left vague. An outline of some of these documents is below:

WO 99/23381—Apparatus for Conditioning a Fluid

This document teaches an apparatus for conditioning a fluid flowing in a pipe by means of a magnetic field. The fluid may be "fuel" and the magnet may be neodymium iron boron particles which are centred and compressed to provide a particularly strong permanent magnet. The document teaches the conditioning of a liquid using permanent magnets.

U.S. Pat. No. 6,056,872—Magnetic device for the treatment of fluids

This document discloses a device for the magnetic treatment of fluids such as gases or liquids. The device includes a plurality of sets of magnets (permanent or electromagnets) for imparting a magnetic field to a fluid. The magnets are arranged peripherally about a pipe or other fluid conduit within which is a flowing fluid, and the device utilises magnets having different magnetic field strengths for varying the field flux along the length of the pipe or fluid conduit. It is to be noted that in the background of the invention portion of the specification, the problems discussed relate to the prevention of scaling, corrosion or algae growth in pipes. Magnetic devices are also discussed in the context of improving the fuel consumption of, and reducing the undesirable omissions of engines.

Paraffins are a major problem in the production of some crude oils. Although paraffins usually remain in solution in the formation, as the oil is produced some of the light ends are lost which can alter the crystalline pattern of the paraffin allowing it to precipitate and/or create a paraffin wax due to temperature changes. Approximately 40% of the cost to bring useable petroleum to the market is in the control of paraffin.

It is known to use chemicals, usually acids and expensive biocides, to prevent, dissolve or remove these materials from the pipes. However, these are not always effective. The chemicals may be toxic or expensive and frequently these chemicals provide a long term operating expense as they must be continuously added to the fluid.

It will be clearly understood that, if a prior art publication is referred to herein, this reference does not constitute an admission that the publication forms part of the common general knowledge in the art in Australia or in any other country.

SUMMARY OF THE INVENTION

The present invention is directed to an apparatus for the magnetic treatment of fluids which may at least partially overcome at least one of the abovementioned disadvantages or provide the consumer with a useful or commercial choice.

In one form, the invention resides in an apparatus for the magnetic treatment of fluids which produces a change in at least one physical or rheological characteristic of the fluid treated, the apparatus including at least one magnetic means for applying a magnetic field to a fluid.

In a more particular form, the invention resides in an apparatus for the magnetic treatment of fluids which produces at least one magnetic field for a period of time, $T_c$ at or above a critical magnetic field strength, $H_c$, the period $T_c$ and the field strength $H_c$ determined relative to one another and dependant upon the properties of the fluid.

In another form, the invention may reside in a method for the magnetic treatment of fluids, the method including the step of applying at least one magnetic field to a fluid to be treated.

In a more particular form, the invention resides in a method for the magnetic treatment of fluids the method including the step of applying at least one magnetic field for a period of time, $T_c$ at or above a critical magnetic field strength, $H_c$, the period $T_c$ and the field strength $H_c$ determined relative to one another and dependant upon the properties of the fluid.

The method and apparatus according to the present invention find particular application when applied to fluids with hydrocarbons whether they be liquids or gaseous. It is to be appreciated that while particularly applicable to hydrocarbon fluids or those containing hydrocarbons (whether a mixture or not), the apparatus and method of the present invention may be used with other fluids. Generally, a simple way of applying the magnetic field to the fluid may be as the fluid is flowing and as such, the field may be applied to a fluid flowing through a pipe or conduit.

While not wishing to be bound by theory, it appears a hydrocarbon fluid may be notionally divided into "particles", which can be defined as large molecules, suspended in a base fluid made up of smaller molecules which are usually in the majority and thus form the base liquid. The viscosity of the hydrocarbon fluid may therefore be approximated as the viscosity of a liquid suspension, which is very different to single-molecule liquid, such as water and liquid nitrogen. For the same volume fraction, $\Phi$, the apparent viscosity depends on the particle size. As the particles get smaller, the apparent viscosity gets higher. This can be seen from the Mooney equation [4], $$\eta/\eta_0=\exp[2.5\Phi/(1-k\Phi)], \quad (1)$$

where the crowding factor k increases as the particle size decreases. Some prior art experiments estimated k=1.079+exp(0.01008/D)+exp(0.00290/$D^2$) for micrometer-size particles, where D is the particle diameter in unit of micrometers.

Each of the large molecules or "particles" has a magnetic susceptibility $\mu_p$ which is different from the magnetic susceptibility of the base fluid $\mu_f$. In a magnetic field, the particles are thus polarised along the field direction. If the particles are uniform spheres of radius a, in a magnetic field the dipole moment may be estimated by the formula:

$$m=Ha^3(\mu_p-\mu_f)/(\mu_p-2\mu_f) \quad (2)$$

where H is the local magnetic field, which should be close to the external field in dilute cases. The dipolar interaction between these to dipoles induces magnetic dipoles, the strength of which is given by:

$$U=\mu_f m^2(1-3\cos^2\theta)/r^3 \quad (3)$$

where r is the distance between these two dipoles and θ is the angle between the straight line between the dipoles and the magnetic field. If this interaction is stronger than the normal Brownian motion, these two dipoles will aggregate together to align in the field direction. If the dipole interaction is very strong and the duration of magnetic field is long enough, the particles will aggregate into macroscopic chains or columns, which will jam the liquid flow and increase the apparent viscosity, a well known phenomenon in magnetorheological (MR) fluids.

It has been surprisingly found that if the applied magnetic field is a short pulse, the induced dipolar interaction does not have enough time to affect particles at macroscopic distances apart, but forces nearby ones into small clusters. The assembled clusters are thus of limited size, for example of micrometer size. While the particle volume fraction remains the same, the average size of the "new particles" is increased. This may lead to the reduction in apparent viscosity because the value of the crowding factor k, is reduced.

Preferably, the correlation between the strength of the magnetic field $H_c$ and the period of application of the field, $T_c$ may be calculated according to the following Once the magnetic field applied to the fluid for $T_c$ ceases, the induced dipolar interaction will generally disappear. However, typically, the aggregated clusters of particles could sustain for a period of time due to hysteresis. After a time, the Brownian motion and other variable disturbances will typically act to break the assemble particles down. After the assembled particles are completely broken down (which could take approximately 8 to 10 hours, breakdown time $T_b$), the rheological properties of the liquid suspension generally return to the state of prior to the magnetic treatment. Therefore, it would be preferable for applications in long distance or extended transport time fluid transport, for example fuel oil pipelines, that the magnetic field be applied to the fluid at periods determined according to the breakdown time, $T_b$.

Suitably, there may be a plurality of apparatus applying the magnetic field spaced along a conduit or pipe transporting the fluid. The separation distance of the apparatus may be determined according to the velocity of the fluid flow through the conduit and the breakdown time, $T_b$. The application of the field and the spacing of the magnetic assemblies on a pipe with respect to the flow rate through the pipe may be adjusted or adjustable in order to maintain a lowered viscosity in the fluid.

If the particle number density is n, two neighbouring particles are typically separated about $n^{-1/3}$. Using Equation (2), the dipolar interaction between two neighbouring particles is about $m^2 n\mu_f$. In order for particles to cluster together, this interaction will preferably be stronger than the thermal Brownian motion which acts to pull neighbouring particles together. Suitably, the following parameter, α which may specify the competition between the dipolar interaction and the thermal motion may then be arrived at $$\alpha=\mu_f m^2 n/(k_B T)\geqq 1 \quad (4)$$

where $k_B$ is the Boltzmann constant and T is the absolute temperature.

With Equation (2), the critical field to be applied in order to realise the invention may then be calculated as $$H_c=[k_B T/(n\mu_f)]^{1/2}(\mu_p+2\mu_f)/[\alpha^3(\mu_p-\mu_f)] \quad (5)$$

If the applied magnetic field is weaker than $H_c$, the thermal Brownian motion may prevent particles from aggregating together. In order to change the apparent viscosity of the liquid suspension, the applied magnetic field applied according to the invention, is suitably not lower than $H_c$ From the dipolar interaction, the force between two neighbouring particles is generally about $6\mu_f m^2 n^{4/3}$. Using the relation for Stoke's drag force on a particle $6\alpha\pi\eta_a v$, the particle's average velocity is suitably about $v=\mu_f m^2 n^{4/3}/(\pi\eta_a a)$.

The time required for two neighbouring particles to get together may then be approximately about $$\tau=n^{-1/3}/v=\pi\eta_0(\mu_p+2\mu_f)^2/[\mu_f n^{5/3}a^5(\mu_p+\mu_f)^2H^2]=\pi\eta_0 a/(n^{2/3}k_B T\alpha). \quad (6)$$

If the duration of magnetic field is too much shorter than τ, the particles may not have enough time to aggregate together. On the other hand, if the duration of magnetic field is much longer than τ, macroscopic chains may be formed and the apparent viscosity of the fluid could be increased instead of reduced.

Therefore, according to a preferred embodiment of the invention, a suitable duration of the magnetic field should be in the order of τ. From Equation (6), it is clear that if the applied magnetic field is getting stronger, the pulse duration should get shorter. Therefore, the strength of the applied magnetic field, $H_c$ may be determined relative to the period of application of the field, $T_c$.

In MR fluids (α≧100), the dipolar interaction may be too strong and force the particles into chains along the field direction in milliseconds. In petroleum oils, the induced magnetic dipolar interaction may suitably be much weaker than that in MR fluids. Therefore, according to a particularly preferred embodiment of the present invention, in which the fluid treated has an α-value between 1 and 10, the apparent viscosity of a liquid suspension may be effectively reduced by selecting a suitable duration of application of a magnetic field.

The aggregated particles by the magnetic field which generally result from use of the invention, may not be spherical. They may be elongated along the field direction and may rotate under the influence of magnetic field, which may further help the reduction of the apparent viscosity, An apparatus may be provided embodying the invention. Generally, the apparatus for applying the magnetic field will be magnets. The magnets may be constructed of any appropriate material and may, for example, be permanent magnets or electromagnets as known to the art or which may hereinafter be developed. When the magnets are permanent magnets, especially suitable magnetic materials include ceramics, and rare earth materials, which particularly include neodymium-iron-boron magnets as well as samarium-cobalt type magnets.

With the case of electromagnets, it will be apparent that these should be attached to an appropriate electrical source so that their electromagnetic properties are maintained. The physical form of the magnets may be of any appropriate form and it is only preferred in the arrangements of the apparatus described herein.

The magnets should have a Curie temperature sufficiently high that they retain their magnetic characteristics at the operating temperatures to which they are exposed. For example, in an automobile engine, the fuel line magnets will lie above the engine block where relative heating will greatly increase their temperature. Some magnets lose much of their magnetic field strength as their temperature rise. The Curie temperature of Alnico magnets are 760° C. to 890° C., of Ceramic magnets (ferrite magnets) 450° C., of Neodymium 310° C. to 360° C. and of Samarium 720° C. to 825° C.

It is also to be understood that magnets which have been described above with reference to the invention may be magnets, as well as any combination of a magnet and one or more elements which may act to improve the penetration of the magnetic field into the conduit, or which condenses the field strength of the magnet. These include the use of one or more pole pieces formed of iron or steel, especially low carbon content cold rolled steel. Such a pole piece is preferably positioned intermediate one face or one pole of a magnet, and the exterior wall of a conduit. Desirably, the portion of the pole piece in contact with the exterior wall of the conduit has a profile which approximates the profile of the exterior wall of the conduit so that the pole piece may be mounted onto the conduit. Typically, the portion of the pole piece in contact with the exterior wall has an arcuate profile which corresponds to the exterior radius of a conduit, especially a pipe. Where the conduit has a flat surface (such as for conduit having a square, triangular or rectangular shaped cross section) the portion of the pole piece in contact with the exterior wall may be a flat profile. The pieces may be arranged on any side of any of the magnets, such as intermediate the magnet and the outer wall of the conduit, in contact with at least a part of a magnet and at the same time perpendicular to exterior wall of the conduit. The pole piece may also be tapered such that the face of the pole piece which is in contact with the magnet is equal to or greater than the surface area of the side of the magnet which it contacts, but on its opposite face, the pole piece has a lesser surface area. In such an arrangement the pole piece is provided with a tapered configuration which acts to concentrate the magnetic field at the interface of the magnet with pole piece, to the smaller area at the opposite face of the pole piece which is at or near the exterior wall of the pipe.

With regard to the construction of the apparatus according to the present invention, any means which are suited for peripherally arranging each of the sets of magnets with respect to a conduit as described above may be used. The magnets need not physically contact the conduit, but this may be desirable with a ferromagnetic conduit such as an iron or steel pipe. These means may include appropriate mechanical means such as clamps, brackets, bands, straps, housing devices having spaces for retaining the magnets therein, as well as chemical means such as adhering the magnets to the exterior wall of the conduit.

Any suitable means including any of the means or devices which may have been described in any of the patents mentioned above, may be used. In further embodiments, it is also contemplated that the sets of magnets could be an integral part of the conduit such as being included in the construction of the wall of the conduit as well. The sets of magnets may also be placed on the interior wall of the conduit. It is also contemplated that the sets of magnets used to practise the invention may form an integral part of the wall of a conduit. In such an arrangement, there may be provided a conduit section with flanges, threads or other means of attachment which may be used to insert said conduit section in-line with the conduit within which flows a fluid. Such a conduit section would include magnets in an arrangement in accordance with the present inventive concepts taught herein, included in or as part of the wall of the conduit section.

The method and apparatus of the present invention may also be applied to atomisation of hydrocarbon fluids. Atomisation generally occurs as a result of interaction between a liquid and the surrounding air, and the overall atomisation process involves several interacting mechanisms, among which is the splitting up of the larger drops during the final stages of disintegration. In equilibrium, a droplet's radius is determined by the liquid's surface tension and the pressure difference, $$r=2\gamma/\Delta p \quad (7)$$

where $\gamma$ is the surface tension and $\Delta p=p_i-p_a$ is the pressure difference between pressure inside the droplet, $p_i$, and the air pressure near the droplet surface, $p_a$. The size r in Equation (7) is usually noted as the critical size. In the spray process, drops may be initially much larger than r. They then may break again and again into small droplets. The influence of liquid's viscosity, by opposing deformation of the drop, may increase the break-up time. Therefore, low liquid viscosity favours quick breaking of drops and leads to smaller size of droplets.

In addition, in many complex fluids, if a fluid's viscosity is reduced, its surface tension also goes down. It is anticipated that a pulsed magnetic field applied according to the method of the invention may also reduce the surface tension of these petroleum fuels as well as their apparent viscosity.

BRIEF DESCRIPTION OF THE DRAWINGS

Various embodiments of the invention will be described with reference to the following drawings, in which.

DETAILED DESCRIPTION OF THE INVENTION

According to an aspect of the invention, a method for treating hydrocarbons and particularly fuels, fuel oils and crude oils is provided.

A number of examples applications were undertaken wherein a magnetic field was applied to a hydrocarbon fluid for a period of time, $T_c$ at or above a critical magnetic field strength, $H_c$. The period $T_c$ and the field strength $H_c$ were determined relative to one another and were dependant upon the properties of the fluid. The imposition of the magnetic field in this manner was found to reduce the apparent viscosity of the fluid.

In the examples, the method and apparatus were used to treat pure gasoline, pure diesel and pure kerosene without any additives. However, since the bulk of the hydrocarbon fluids produced contains additives of some kind, the examples described herein were conducted on hydrocarbon fluids having composition which approximate the major types of fuels used for automobiles and trucks and also on crude oil.

The examples were conducted using a Brookfield® digital viscometer LVDV-II+ equipped with a UL adapter. The Brookfield LVDV-II+ viscometer measures fluid viscosity at a given shear rate. The principal of operation is to drive a spindle immersed in the test fluid through a calibrated spring. The viscous drag of the fluid against the spindle is measured by the spring deflection and measured with a rotary transducer. The LVDV-II+ has a measurement range of 15-2,000,000 cP.

The UL adaptor consists of a precision cylindrical spindle rotating inside an accurately machined tube to measure the viscosity of low viscosity fluids with a high accuracy. With the UL adaptor and spindle, viscosities in the range of 1-2,000 cP are measurable.

In the following description and the accompanying figures, the magnetic field was imposed at time zero (T=0).

EXAMPLE 1

Gasoline with 20% Ethanol

Ethanol is an important additive in gasoline sold in some markets. This example was conducted on gasoline with 20% ethanol. It is interesting to note that pure gasoline has very low viscosity, about 0.8 cP at 10° C. However, ethanol has quite high viscosity, about 1.7 cP at 10° C. Therefore, a mixture of gasoline with 20% ethanol has viscosity of about 0.95 cP.

Figure 1:
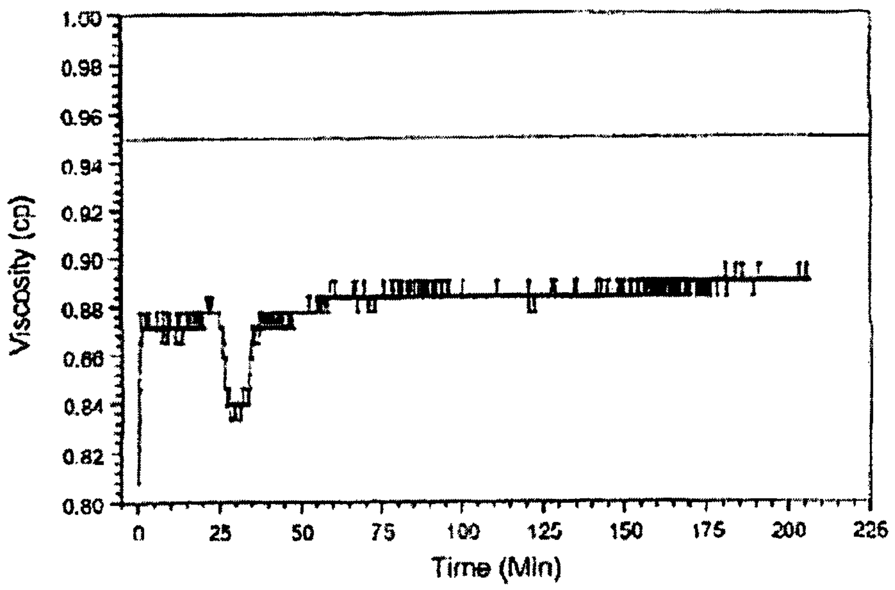
FIG. 1 is a graph illustrating the viscosity of gasoline with 20% ethanol at 10° C. and 95 rpm after application of a magnetic field of 1.3 T for 5 seconds.

A strong magnetic field of 1.3 T was applied to the sample for 5 seconds. The apparent viscosity dropped to 0.81 cP, but soon climbed to about 0.865 cP, fluctuating there and gradually increasing, as seen in FIG. 1. However, after 3 hours, the apparent viscosity remained at 0.88 cp, 8% below the original value. The apparent viscosity remained substantially below the original value 200 minutes after the application of magnetic field. We expect that the viscosity would return to 0.95 cp in about 10 hours.

EXAMPLE 2

Gasoline with 10% MTBE

MTBE (methyl tertiary butyl ether) is still widely used as gasoline additive. This example was conducted on gasoline with 10% MTBE. Different from ethanol, MTBE has quite low viscosity. Therefore, a mixture of gasoline with 10% MTBE at 10° C. has a viscosity of 0.84 cP, slightly higher than that of pure gasoline.

A magnetic field of 1.3 T was applied to the sample for about 1 second. The apparent viscosity immediately dropped to 0.77 cP. Then it was fluctuating around 0.78 cP for several hours and gradually increasing, as can be seen from FIG. 2.

Figure 2:
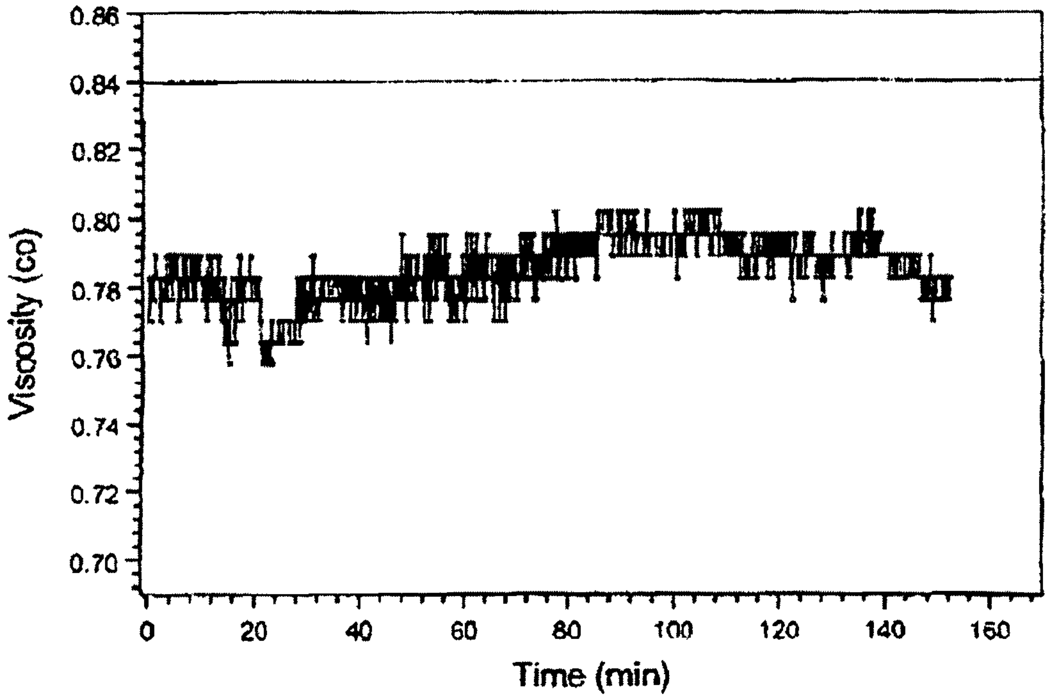
FIG. 2 is a graph illustrating the viscosity of gasoline with 10% MTBE at 10° C. and 95 rpm after application of a magnetic field of 1.3 T for 1 second.

However, as shown in FIG. 2, after more than 2 hours, the viscosity remained about 7% below 0.84 cP, the previous value. The apparent viscosity remained substantially below the original value 150 minutes after the application of magnetic field. This behaviour is quite similar to that of gasoline with ethanol in a pulse magnetic field, but we also noted that for gasoline with 10% MTBE the magnetic pulse duration should be shorter than that for gasoline with 10% ethanol.

EXAMPLE 3

Diesel Fuel

Diesel has much higher viscosity than that of gasoline. Example 3 was conducted on pure diesel and diesel with 0.5% of ethylhexyl nitrate (EHN) as additive. The behaviour for both samples is quite similar because the volume fraction of the additive is very small.

Figure 3:
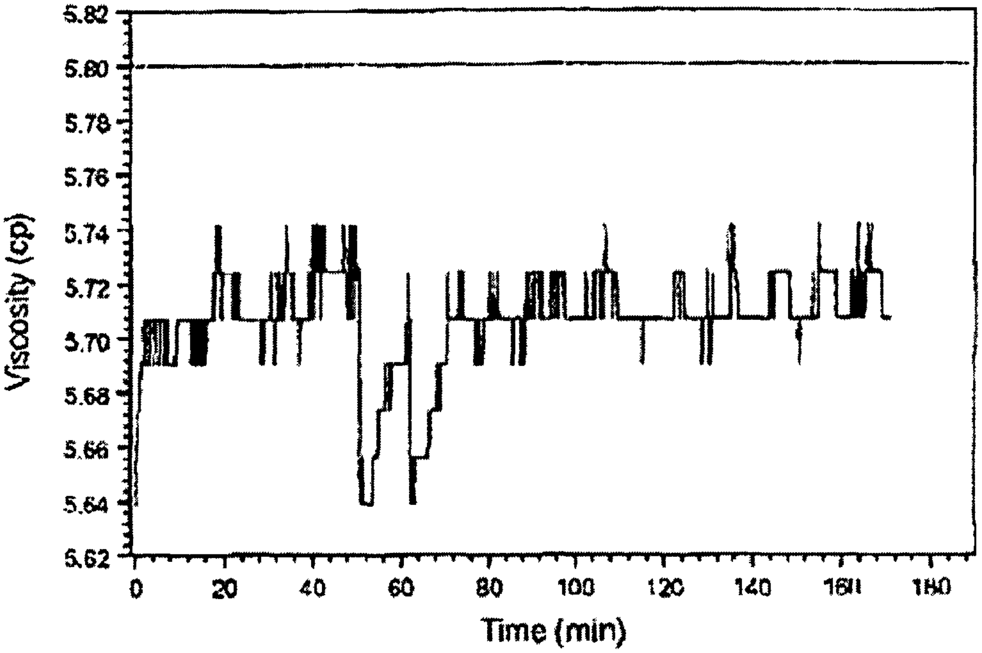
FIG. 3 is a graph illustrating the viscosity of diesel at 10° C. and 35 rpm after application of a magnetic field of 1.1 T for 8 seconds.

As shown in FIG. 3, diesel has a viscosity of 5.80 cP at 10° C. which is considerably higher than that of gasoline. After application of a magnetic field of 1.1 T for 8 seconds, the apparent viscosity dropped to 5.64 cP, then remained at 5.70 cP for several hours. The apparent viscosity remained below the original value 160 minutes after the application of magnetic field.

Further testing may be required to determine the optimal duration of magnetic pulse. On one hand, since diesel is more close to crude oil, it is expected that the magnetic field induced dipolar interaction should be stronger than that in gasoline. On the other hand, since the diesel's original viscosity is higher than that of gasoline, it is expected the magnetic pulse should have a slightly long duration. The results in FIG. 3 indicate that a pulse magnetic field can reduce the apparent viscosity of diesel.

EXAMPLE 4

Crude Oil

Figure 4:
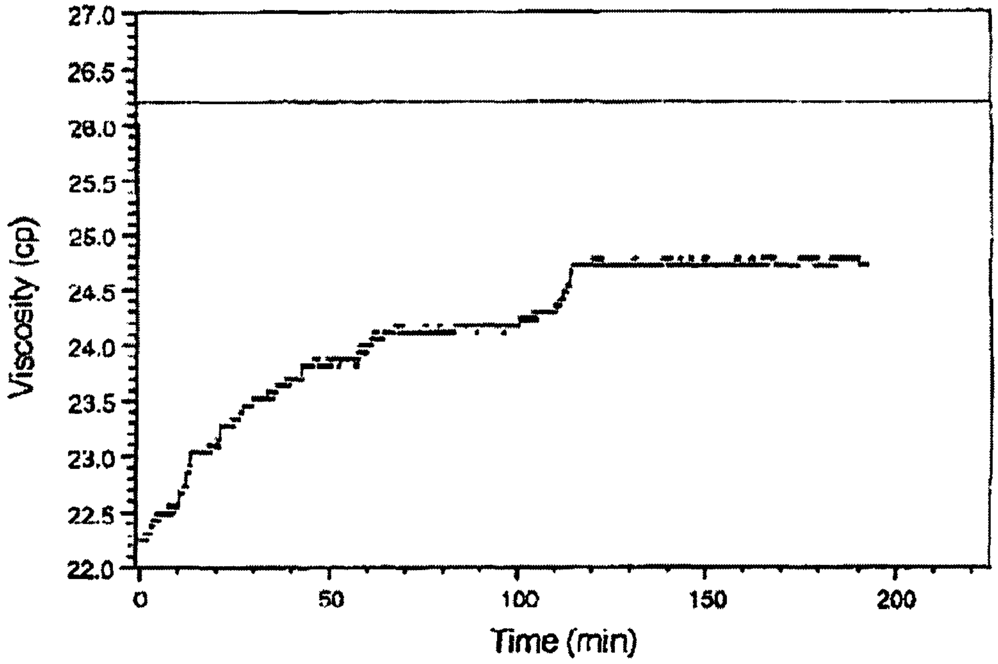
FIG. 4 is a graph illustrating the viscosity of Sunoco crude oil at 10° C. and 10 rpm after application of a magnetic field of 1.3 T for 4 seconds.

Example 4 was conducted with Sunoco crude oil. Since Sunoco crude oil is light crude oil and has low wax-appearance temperature, the example was performed at 10° C. As shown in FIG. 4, at that temperature Sunoco crude oil has a viscosity about 26.2 cp. After application of a magnetic field of 1.3 T for 4 seconds, the apparent viscosity dropped to 22.2 cp, which was 16% lower than the original value. After the magnetic field was turned off, the viscosity remained low, but was gradually increasing.

After 200 minutes, it reached 25.0 cp, but still 5% below the original value. From extrapolation of this curve, it is expected that the viscosity will return to the original value after about 10 hours.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

The invention claimed is:

1. A method for the magnetic treatment of fluids, the method including the step of applying at least one magnetic field for a period of time, $T_c$ at or above a critical magnetic field strength, $H_c$, the period $T_c$ and the field strength $H_c$ determined relative to one another and dependant upon the properties of the fluid and wherein the fluids treated includes hydrocarbons whether they be liquids or gaseous.

2. The method according to claim 1 wherein the hydrocarbon fluid is notionally divided into "particles", which can be defined as large molecules, suspended in a base fluid made up of smaller molecules in the majority, each of the large molecules having a magnetic susceptibility $\mu_p$ which is different from the magnetic susceptibility of the base fluid $\mu_f$, the particles polarised along a field direction in a magnetic field.

3. The method as claimed in claim 1 including providing a plurality of apparatus operating according to the method to apply the magnetic field spaced along a conduit or pipe transporting the fluid, spacing the apparatus according to a velocity of the fluid flow through the conduit or pipe and a breakdown time, $T_b$, which is dependant upon the period $T_c$, the field strength $H_c$.

4. The method according to claim 1 wherein the critical magnetic field strength, $H_c$ applied is calculated according to the formula:

$$H_c=[k_BT/(n\mu_f)]^{1/2}(\mu_p+2\mu_f)/[\alpha^3(\mu_p-\mu_f)]$$

in which $k_B$ is Boltzmann's constant; T is absolute temperature; n is the particle number density of notional particles in a base fluid; $\mu_f$ is the magnetic susceptibility of the base fluid; $\mu_p$ is the magnetic susceptibility of the notional particles; and $\alpha$ is calculated according to the formula:

$$\alpha=\mu_f m^2 n/(k_BT)$$

in which m is the dipole moment between the particle and the base fluid.

5. The method according to claim 4 wherein the period, $T_c$ is equal to $\tau$ calculated according to the formula:

$$\tau=n^{-1/3}/v=\pi\eta_0(\mu_p+2\mu_f)^2/[\mu_f n^{5/3}a^5(\mu_p+\mu_f)^2H^2]=\pi\eta_0 a/(n^{2/3}k_BT\alpha)$$

in which n is the particle number density of notional particles in a base fluid; v is a notional particle average velocity; $\eta_0$ is the viscosity of the base fluid; $\mu_p$ is the magnetic susceptibility of the notional particles; $\mu_f$ is the magnetic susceptibility of the base fluid; a is the radius of a spheroidal particle; H is calculated according to the formulae in claim 3; $k_B$ is Boltzmann's constant; T is absolute temperature; n is the particle number density of notional particles in a base fluid; $\mu_f$ is the magnetic susceptibility of the base fluid; $\mu_p$ is the magnetic susceptibility of the notional particles; and $\alpha$ is calculated according to the formula:

$$\alpha=\mu_f m^2 n/(k_BT)$$

in which m is the dipole moment between the particle and the base fluid.

6. The method according to claim 5 wherein the period, $T_c$ is in the order of $\tau$.

7. The method according to claim 1 wherein producing the magnetic field is achieved using one or more magnetic means.

8. The method according to claim 7 including the step of providing at least one magnetic means peripherally arranged about a conduit through which the fluid flows.

* * * * *